(12) United States Patent
Li

(10) Patent No.: US 12,095,409 B2
(45) Date of Patent: Sep. 17, 2024

(54) FIXING DEVICE OF PHOTOVOLTAIC PANEL

(71) Applicant: Shanghai Chiko Solar Technology Co., Ltd., Shanghai (CN)

(72) Inventor: Jinbei Li, Shanghai (CN)

(73) Assignee: Shanghai Chiko Solar Technology Co., Ltd., Shanghai (CN)

( * ) Notice: Subject to any disclaimer, the term of this patent is extended or adjusted under 35 U.S.C. 154(b) by 0 days.

(21) Appl. No.: 18/299,473

(22) Filed: Apr. 12, 2023

(65) Prior Publication Data

US 2023/0253915 A1    Aug. 10, 2023

(30) Foreign Application Priority Data

Oct. 25, 2022   (CN) .......................... 202211309472.6

(51) Int. Cl.
    *H02S 20/30* (2014.01)
(52) U.S. Cl.
    CPC .................................. *H02S 20/30* (2014.12)
(58) Field of Classification Search
    CPC ....................................................... H02S 20/30
    See application file for complete search history.

(56) References Cited

U.S. PATENT DOCUMENTS

| 2022/0011700 A1 | 1/2022 | Kakigahara et al. |
| 2022/0035283 A1 | 2/2022 | Fukue et al. |
| 2022/0244666 A1 | 8/2022 | Ohta et al. |

FOREIGN PATENT DOCUMENTS

CN            106788158      *  5/2017

* cited by examiner

*Primary Examiner* — Jayne L Mershon
(74) *Attorney, Agent, or Firm* — Hemisphere Law, PLLC; Zhigang Ma

(57) ABSTRACT

The present disclosure provides a fixing device of a photovoltaic panel, and relates to the field of fixing devices. The fixing device of a photovoltaic panel includes a mounting rail, a photovoltaic panel, a medium pressure fixing member and a side pressure fixing member; the medium pressure fixing member includes a medium pressure block, a first bolt, a spring, a first limiting plate and a first clamping block; the side pressure fixing member includes a side pressure block, a second bolt, a second limiting plate and a second clamping block; the photovoltaic panel is arranged on the mounting rail; a side edge of the medium pressure block is arranged on a side edge of the photovoltaic panel; and a side edge of the side pressure block is arranged on a side edge of the photovoltaic panel.

12 Claims, 5 Drawing Sheets

FIXING DEVICE OF PHOTOVOLTAIC PANEL

TECHNICAL FIELD

The present disclosure relates to the field of fixing devices, specifically to a fixing device of a photovoltaic panel.

BACKGROUND

With the popularization of solar power generation, the market has an increasing demand for solar stands. In addition to considering environmental protection, service life and safety of materials, the mounting requirements for photovoltaic panels of different specifications and the convenience of mounting and removal shall also be considered. Therefore, a device with a non-hierarchical adjustment function is needed, which is suitable for mounting photovoltaic panels with various specifications, and is convenient for mounting and removal, so as to improve the working efficiency and improve the reuse frequency of a product.

SUMMARY

An embodiment of the present disclosure aims to provide a fixing device of a photovoltaic panel, which can solve the technical problem that a fixing device cannot meet the mounting requirements for photovoltaic panels of different specifications.

An embodiment of the present disclosure provides a fixing device of a photovoltaic panel, including a mounting rail and a medium pressure fixing member. The mounting rail is provided with a mounting slot. The medium pressure fixing member includes a medium pressure block, a bolt, a spring, a limiting plate and a clamping block. The medium pressure block ist connected to a top of the bolt. The clamping block is connected to a bottom of the bolt and slidably arranged in the mounting slot. The spring and the limiting plate are both sleeved on the bolt. The spring is arranged between the medium pressure block and the limiting plate, with its two ends abutting against the medium pressure block and the limiting plate respectively. The spring is configured to push the limiting plate to move toward the clamping block, so that the limiting plate is able to cooperate with the clamping block to clamp the medium pressure fixing member onto the mounting rail. The medium pressure block includes a connecting plate and a pair of L-shaped side plates extending upwardly from opposite sides of the connecting plate, where the side plates and the connecting plate cooperate to form a U-shaped accommodating groove. The bolt is connected to the connecting plate, with the top of the bolt being received in the accommodating groove; the L-shaped side plate forms a clamping opening to clamp a side edge of the photovoltaic panel, thereby mounting the photovoltaic panel onto the guide rail.

A lower surface of the side plate in contact with side edge of the photovoltaic pane is corrugated, allowing the side plate to tightly clamp the side edge of the photovoltaic panel.

The clamping block is provided with upward clamping teeth; an upper edge of the mounting slot is provided with downward clamping teeth; wherein the upward clamping teeth are configured to engage with the downward clamping teeth, in order to limit the sliding of the clamping block in the mounting slot, and combine the clamping block to the mounting rail firmly.

The side plate is provided with a through hole. The fixing device further includes a screw, where the screw is configured to penetrate through the through hole to firmly fix the medium pressure block and the photovoltaic panel together.

An embodiment of the present disclosure provides a fixing device of a photovoltaic panel, including a mounting rail and a side pressure fixing member. The mounting rail is provided with a mounting slot. The side pressure fixing member includes a side pressure block, a bolt, a spring, a limiting plate and a clamping block. The side pressure block is connected to a top of the bolt. The clamping block is connected to a bottom of the bolt and slidably arranged in the mounting slot. The spring and the limiting plate are both sleeved on the bolt. The spring is arranged between the side pressure block and the limiting plate, with its two ends abutting against the side pressure block and the limiting plate respectively. The spring is configured to push the limiting plate to move toward the clamping block, so that the limiting plate is able to cooperate with the clamping block to clamp the side pressure fixing member onto the mounting rail. The side pressure block includes a connecting plate, an L-shaped side plate, and a downward pressure plate. The side plate and the downward pressure plate are arranged on opposite sides of the connecting plate. The side plate extends upwards from the connecting plate, and the downward pressure plate extends downwards from the connecting plate; where the side plate and the connecting plate cooperate to form an L-shaped accommodating groove. The bolt is connected to the connecting plate, with the top of the bolt being received in the accommodating groove. The L-shaped side plate forms a clamping opening to clamp a side edge of the photovoltaic panel, thereby mounting the photovoltaic panel onto the guide rail. The limiting plate is provided with an upward pressure plate and a downward hook arranged on opposites sides of the limiting plate, where the upward pressure plate is configured to abut against the downward pressure plate, in order to balance reaction force of the photovoltaic panel on the side pressure block when the side plate clamps on the photovoltaic panel. The downward hook is slidably arranged in the mounting slot and configured to hook an upper edge of the mounting slot, to combine the limiting plate to the mounting rail. Trench structures are arranged on contact surfaces of the downward pressure plate of the side pressure block and the upward pressure plate of the limiting plate.

A lower surface of the side plate in contact with the side edge of the photovoltaic pane is corrugated, allowing the side plate to tightly clamp the side edge of the photovoltaic panel.

The clamping block is provided with upward clamping teeth; the upper edge of the mounting slot is provided with downward clamping teeth; wherein the downward clamping teeth are configured to engage with the upward clamping teeth, in order to limit the sliding of the clamping block in the mounting slot, and combine the clamping block to the mounting rail firmly; the downward clamping teeth are further configured to engage with the downward hook, to combine the limiting plate to the mounting rail firmly.

The side plate is provided with a through hole. The fixing device further includes a screw, wherein the screw is configured to penetrate through the through hole to firmly fix the side pressure block and the photovoltaic panel together.

A a side portion of the mounting rail is provided with a trunking for placing a photovoltaic cable of the photovoltaic panel.

Thicknesses of the downward hook and the clamping block are both less than a depth of the mounting slot.

The present disclosure has the beneficial effects.

The present disclosure provides a fixing device of a photovoltaic panel, including a mounting rail, a photovoltaic panel, a medium pressure fixing member and a side pressure fixing member. The photovoltaic panel is arranged on the mounting rail; a side edge of the medium pressure block is arranged on a side edge of the photovoltaic panel; and a side edge of the side pressure block is arranged on a side edge of the photovoltaic panel. According to fixing device of the photovoltaic panel, the fixing members have a non-hierarchical adjustment function and are suitable for mounting photovoltaic panels of various specifications; the photovoltaic panel and the mounting rail are combined more firmly; meanwhile, the fixing members capable of being slidably mounted are convenient to mount and remove, so that the working efficiency is improved, and the reuse frequency of a product is increased.

BRIEF DESCRIPTION OF THE DRAWINGS

In order to explain the technical solutions of the embodiments of the present disclosure more clearly, the following will briefly introduce the accompanying drawings used in the embodiments. It should be understood that the drawings in the following description only illustrate some embodiments of the present disclosure and thus shall not be deemed as limiting the scope. Those of ordinary skill in the art can obtain other related drawings based on these drawings without creative work.

Figure 1:
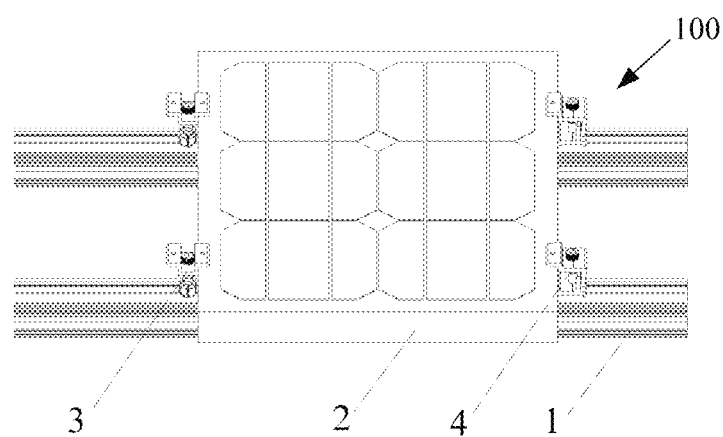
FIG. 1 is a schematic diagram of an entire structure of the present disclosure.

Reference signs in the drawings are respectively as follows:

100: fixing device; 1: mounting rail; 2: photovoltaic panel; 3: medium pressure fixing member; 4: side pressure fixing member; 11: mounting slot; 12: clamping tooth; 13: trunking; 31: medium pressure block; 32: screw; 33: bolt; 34: spring; 35: limiting plate; 36: clamping block; 37: clamping tooth; 41: side pressure block; 42: screw; 43: bolt; 44: limiting plate; 45: clamping teeth; 46: clamping block; 47: downward hook; 48: spring; 311: connecting plate; 312: side plate; 313: accommodating groove; 3121: clamping opening; 3122: through hole; 411: connecting plate; 412: side plate; 413: downward pressure plate; 414: accommodating groove; 441: upward pressure plate; 4121: clamping opening; and 4122: through hole.

DETAILED DESCRIPTION OF THE EMBODIMENTS

In order to make the objectives, technical schemes and advantages of the embodiments of the present disclosure clearer, the technical schemes in the embodiments of the present disclosure will be described clearly and completely below in combination with the drawings in the embodiments of the present disclosure. Apparently, the embodiments described are part of the embodiments of the present disclosure, not all the embodiments. The components of the embodiments of the present disclosure generally described and shown in the drawings here can be arranged and designed in a variety of different configurations.

Therefore, the following detailed description for the embodiments of the present disclosure provided in the accompanying drawings is not intended to limit the scope of the claimed present disclosure, but merely represents selected embodiments of the present disclosure. Based on the embodiments in present disclosure, all other embodiments obtained by those of ordinary skill in the art without creative work shall fall within the protection scope of the present disclosure.

It should be noted that similar reference signs and letters indicate similar items in the following drawings. Therefore, once a certain item is defined in one drawing, it is unnecessary to be further defined and explained in the subsequent drawings.

In the description of the present disclosure, it should be noted that orientations or positional relationships indicated by the terms "center", "upper", "lower", "left", "right", "vertical", "horizontal", "inner" and "outer" are based on the orientations or positional relationships shown in the accompanying drawings, or the orientations or positional relationships where a product of the present disclosure is usually placed during use, which are only for the convenience of describing the present disclosure and simplifying the description, not intended to indicate or imply that the referred device or element must have a particular orientation and be constructed and operated in a particular orientation. Therefore, they should not be construed as a limitation to the present disclosure. In addition, the terms "first", "second", "third", etc. are only for the purpose of distinguishing descriptions, and may not be understood as indicating or implying the relative importance.

In addition, the terms "horizontal", "vertical", "overhang" and the like do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present disclosure, it should be also noted that unless otherwise explicitly defined and defined, the terms "arranged", "mounted", "coupled", and "connected" shall be understood broadly, and may be, for example, fixedly connected, or removably connected, or integrally connected, or mechanically connected, or electrically connected, or directly connected, or indirectly connected through an intermediate medium, or interconnection between two elements. For those of ordinary skill in the art, the specific meanings of the above terms in the present disclosure can be understood according to specific situations.

Embodiment I

Figure 2:
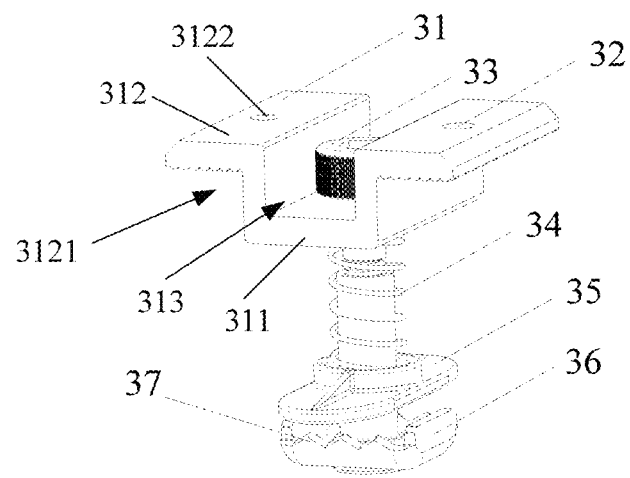
FIG. 2 is a schematic structural diagram of a medium pressure fixing member of the present disclosure.
Figure 3:
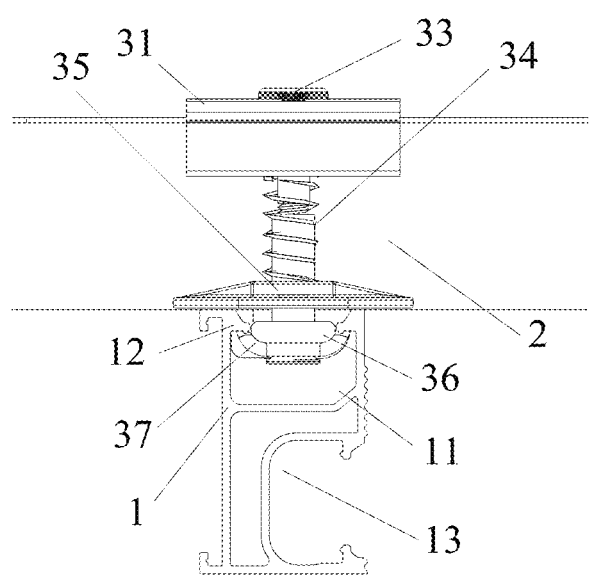
FIG. 3 is a side view schematic diagram of the medium pressure fixing member shown in FIG. 2 when in use.

Referring to FIG. 1, an embodiment of the present disclosure provides a fixing device 100 for a photovoltaic panel 2. The fixing device 100 includes a mounting rail 1 and a medium pressure fixing member 3. Referring to FIG. 2 and FIG. 3, the medium pressure fixing member 3 includes a medium pressure block 31, a bolt 33, a spring 34, a limiting plate 35 and a clamping block 36. The photovoltaic panel 2 is arranged on the mounting rail 1. The medium pressure block 31 is arranged at a top of the bolt 33. The clamping block 36 is arranged at a bottom of the bolt 33. The mounting rail 1 is provided with a mounting slot 11. The clamping block 36 is slidably arranged in the mounting slot 11. The spring 34 and the limiting plate 35 are both sleeved on the bolt 33. The spring 34 is arranged between the medium pressure block 31 and the limiting plate 35, with its two ends abutting against the medium pressure block 31 and the limiting plate 35 respectively. The spring 34 is configured to push the limiting plate 35 to move toward the clamping block 36, so that the limiting plate 35 is able to cooperate with the clamping block 36 to clamp the medium pressure fixing member 3 onto the mounting rail 1.

In this embodiment, the medium pressure block 31 includes a connecting plate 311 and a pair of L-shaped side plates 312 extending upwardly from opposite sides of the connecting plate 311. The side plates 312 and the connecting plate 311 cooperate to form a U-shaped accommodating groove 313. The bolt 33 is connected to the connecting plate 311, with the top of the bolt 33 being received in the accommodating groove 313. The L-shaped side plate 312 forms a clamping opening 3121 to clamp a side edge of the photovoltaic panel 2, thereby mounting the photovoltaic panel 2 onto the guide rail 1.

According to the fixing device 100 of the photovoltaic panel 2, the medium pressure block 31 has a non-hierarchical adjustment function and are suitable for mounting photovoltaic panels 2 of various specifications; the photovoltaic panel 2 and the mounting rail 1 are combined more firmly. Meanwhile, the clamping block 36 capable of being slidably mounted are convenient to mount and remove, so that the working efficiency is improved, and the reuse frequency of a product is increased.

In this embodiment, a lower surface of the side plate 312 in contact with the side edge of the photovoltaic panels 2 is corrugated, which has an antiskid function, allowing the side plate 312 to tightly clamp the side edge of the photovoltaic panel 2, so that the medium pressure block 31 and the photovoltaic panel 2 are combined more firmly.

In this embodiment, the clamping block 36 is provided with upward clamping teeth 37; an upper edge of the mounting slot 11 is provided with downward clamping teeth 12. The upward clamping teeth 37 are configured to engage with the downward clamping teeth 12, in order to limit the sliding of the clamping block 36 in the mounting slot 11, so that the clamping block 36 and the mounting rail 1 are combined more firmly.

In this embodiment, the side plate 312 is provided with a through hole 3122. The fixing device 100 further includes a screw 32, and the screw 32 penetrates through the through hole 3122 to firmly fix the medium pressure block 31 and the photovoltaic panel 2 together. In this embodiment, the screw 32 is mounted on the photovoltaic panel 2 in a punching manner, so that the medium pressure block 31 and the photovoltaic panel 2 are combined more firmly.

In this embodiment, a side portion of the mounting rail 1 is provided with a trunking 13 for placing a photovoltaic cable of the photovoltaic panel 2, to satisfy a power delivery function.

In this embodiment, a thickness of the clamping block 36 is less than a depth of the mounting slot 11, so that when the limiting plate 35 is lifted, the clamping block 36 would leave the upper edge of the mounting slot 11, and the clamping block 36 can smoothly slide in the mounting slot 11 of the mounting rail 1.

Embodiment II

Figure 4:
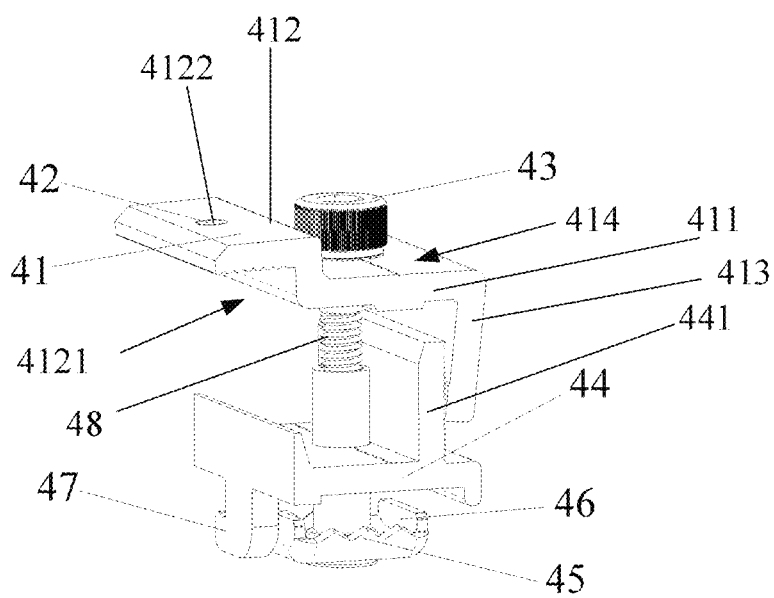
FIG. 4 is a schematic structural diagram of a side pressure fixing member of the present disclosure.
Figure 5:
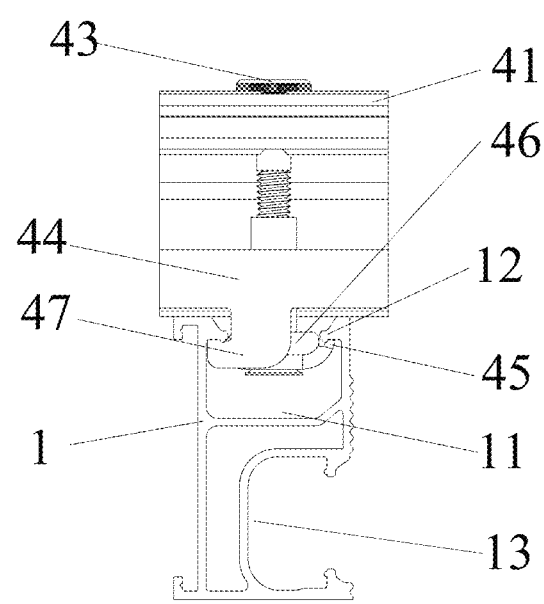
FIG. 5 is a side view schematic diagram of the side pressure fixing member shown in FIG. 4 when in use.

Referring to FIG. 1, an embodiment of the present disclosure provides a fixing device 100 of a photovoltaic panel 2. The fixing device 100 includes a mounting rail 1 and a side pressure fixing member 4. Referring to FIG. 4 and FIG. 5, the side pressure fixing member 4 includes a side pressure block 41, a bolt 43, a limiting plate 44, a clamping block 46 and a spring 48. The photovoltaic panel 2 is arranged on the mounting rail 1. The side pressure block 41 is arranged at a top of the bolt 43. The clamping block 46 is arranged at a bottom of the bolt 43. The limiting plate 44 and the spring 48 are both sleeved on the bolt 43. The mounting rail 1 is provided with a mounting slot 11. The clamping block 46 is slidably arranged in the mounting slot 11. The spring 48 is arranged between the side pressure block 41 and the limiting plate 44, with its two ends abutting against the side pressure block 41 and the limiting plate 44 respectively. The spring 48 is configured to push the limiting plate 44 to move toward the clamping block 46, so that the limiting plate 44 is able to cooperate with the clamping block 46 to clamp the side pressure fixing member 4 onto the mounting rail 1.

In this embodiment, the side pressure block 41 includes a connecting plate 411, an L-shaped side plate 412, and a downward pressure plate 413. The side plate 412 and the downward pressure plate 413 are arranged on opposite sides of the connecting plate 411. The side plate 412 extends upwards from the connecting plate 411, and the downward pressure plate 413 extends downwards from the connecting plate 411. The side plate 412 and the connecting plate 411 cooperate to form an L-shaped accommodating groove 414. The bolt 43 is connected to the connecting plate 411, with the top of the bolt 43 being received in the accommodating groove 414. The L-shaped side plate 412 forms a clamping opening 4121 to clamp a side edge of the photovoltaic panel 2, thereby mounting the photovoltaic panel 2 onto the guide rail 1.

In this embodiment, the limiting plate 44 is provided with an upward pressure plate 441 and a downward hook 47 arranged on opposites sides of the limiting plate 44. The upward pressure plate 441 is configured to abut against the downward pressure plate 413, in order to balance reaction force of the photovoltaic panel 2 on the side pressure block 41 when the side plate 412 clamps on the photovoltaic panel 2. In this embodiment, trench structures are arranged on contact surfaces of the downward pressure plate 413 of the side pressure block 41 and the upward pressure plate 441 of the limiting plate 44. The downward hook 47 is slidably arranged in the mounting slot 11 and configured to hook an upper edge of the mounting slot 11, to combine the limiting plate 44 to the mounting rail 1.

According to the fixing device 100 of the photovoltaic panel 2, the side pressure block 41 has a non-hierarchical adjustment function and are suitable for mounting photovoltaic panels 2 of various specifications; the photovoltaic panel 2 and the mounting rail 1 are combined more firmly. Meanwhile, the clamping block 46 and the downward hook 47 capable of being slidably mounted are convenient to mount and remove, so that the working efficiency is improved, and the reuse frequency of a product is increased.

In this embodiment, a lower surface of the side plate 412 in contact with the side edge of the photovoltaic panels 2 is corrugated, which has an antiskid function, allowing the side plate 412 to tightly clamp the side edge of the photovoltaic panel 2, so that the side pressure block 41 and the photovoltaic panel 2 are combined more firmly.

In this embodiment, the clamping block 46 is provided with an upward clamping teeth 45; an upper edge of the mounting slot 11 is provided with downward clamping teeth 12. The upward clamping teeth 45 are configured to engage with the downward clamping teeth 12, in order to limit the sliding of the clamping block 46 in the mounting slot 11, so that the clamping block 46 and the mounting rail 1 are combined more firmly. The downward clamping teeth 12 are further configured to engage with the downward hook 47, so that the limiting plate 44 and the mounting rail 1 are combined more firmly.

In this embodiment, the side plate 412 is provided with a through hole 4122. The fixing device 100 further includes a screw 42, and the screw 42 penetrates through the through hole 3122 to firmly fix the medium pressure block 41 and the photovoltaic panel 2 together. In this embodiment, the screw 42 is mounted on the photovoltaic panel 2 in a punching manner, so that the side pressure block 41 and the photovoltaic panel 2 are combined more firmly.

In this embodiment, a side portion of the mounting rail 1 is provided with a trunking 13 for placing a photovoltaic cable of the photovoltaic panel 2, to satisfy a power delivery function.

In this embodiment, thicknesses of the clamping block 47 and the clamping block 46 are both less than a depth of the mounting slot 11, so that when the limiting plate 44 is lifted, the downward hook 47 and the clamping block 46 would leave the upper edge of the mounting slot 11, and the downward hook 47 and the clamping block 46 can smoothly slide in the mounting slot 11 of the mounting rail 1.

The above descriptions are merely preferred embodiments of the present disclosure and are not intended to limit the present disclosure. For those skilled in the art, the present disclosure may have various modifications and changes. Any modification, equivalent replacement, or improvement made without departing from the spirit and principle of this application shall fall within the protection scope of the present disclosure.

What is claimed is:

1. A fixing device of a photovoltaic panel, comprising a mounting rail and a medium pressure fixing member, wherein the mounting rail is provided with a mounting slot;
the medium pressure fixing member comprises:
a bolt;
a medium pressure block connected to a top of the bolt;
a clamping block connected to a bottom of the bolt and slidably arranged in the mounting slot; and
a spring and a limiting plate both sleeved on the bolt; wherein the spring is arranged between the medium pressure block and the limiting plate, with its two ends abutting against the medium pressure block and the limiting plate respectively; the spring is configured to push the limiting plate to move toward the clamping block, so that the limiting plate is able to cooperate with the clamping block to clamp the medium pressure fixing member onto the mounting rail;
wherein the medium pressure block comprises a connecting plate and a pair of L-shaped side plates extending upwardly from opposite sides of the connecting plate; wherein the side plates and the connecting plate cooperate to form a U-shaped accommodating groove; the bolt is connected to the connecting plate, with the top of the bolt being received in the accommodating groove; the L-shaped side plate forms a clamping opening to clamp a side edge of the photovoltaic panel, thereby mounting the photovoltaic panel onto the guide rail.

2. The fixing device of the photovoltaic panel according to claim 1, wherein a lower surface of the side plate in contact with the side edge of the photovoltaic pane is corrugated, allowing the side plate to tightly clamp the side edge of the photovoltaic panel.

3. The fixing device of the photovoltaic panel according to claim 1, wherein the clamping block is provided with upward clamping teeth; an upper edge of the mounting slot is provided with downward clamping teeth; wherein the upward clamping teeth are configured to engage with the downward clamping teeth, in order to limit the sliding of the clamping block in the mounting slot, and combine the clamping block to the mounting rail firmly.

4. The fixing device of the photovoltaic panel according to claim 1, wherein the side plate is provided with a through hole;
the fixing device further comprises a screw, wherein the screw is configured to penetrate through the through hole to firmly fix the medium pressure block and the photovoltaic panel together.

5. The fixing device of the photovoltaic panel according to claim 1, wherein a side portion of the mounting rail is provided with a trunking for placing a photovoltaic cable of the photovoltaic panel.

6. The fixing device of the photovoltaic panel according to claim 1, wherein a thickness of the clamping block is less than a depth of the mounting slot.

7. A fixing device of a photovoltaic panel, comprising a mounting rail and a side pressure fixing member, wherein the mounting rail is provided with a mounting slot;
the side pressure fixing member comprises:
a bolt;
a side pressure block connected to a top of the bolt;
a clamping block connected to a bottom of the bolt and slidably arranged in the mounting slot; and
a spring and a limiting plate both sleeved on the bolt; wherein the spring is arranged between the side pressure block and the limiting plate, with its two ends abutting against the side pressure block and the limiting plate respectively; the spring is configured to push the limiting plate to move toward the clamping block, so that the limiting plate is able to cooperate with the clamping block to clamp the side pressure fixing member onto the mounting rail;
wherein the side pressure block comprises a connecting plate, an L-shaped side plate, and a downward pressure plate; wherein the side plate and the downward pressure plate are arranged on opposite sides of the connecting plate; the side plate extends upwards from the connecting plate, and the downward pressure plate extends downwards from the connecting plate; wherein the side plate and the connecting plate cooperate to form an L-shaped accommodating groove; the bolt is connected to the connecting plate, with the top of the bolt being received in the accommodating groove; the L-shaped side plate forms a clamping opening to clamp a side edge of the photovoltaic panel, thereby mounting the photovoltaic panel onto the guide rail;
the limiting plate is provided with an upward pressure plate and a downward hook arranged on opposites sides of the limiting plate; wherein the upward pressure plate is configured to abut against the downward pressure plate, in order to balance reaction force of the photovoltaic panel on the side pressure block when the side plate clamps on the photovoltaic panel; the downward hook is slidably arranged in the mounting slot and configured to hook an upper edge of the mounting slot, to combine the limiting plate to the mounting rail;

wherein trench structures are arranged on contact surfaces of the downward pressure plate of the side pressure block and the upward pressure plate of the limiting plate.

8. The fixing device of the photovoltaic panel according to claim 7, wherein a lower surface of the side plate in contact with the side edge of the photovoltaic pane is corrugated, allowing the side plate to tightly clamp the side edge of the photovoltaic panel.

9. The fixing device of the photovoltaic panel according to claim 7, wherein the clamping block is provided with upward clamping teeth; the upper edge of the mounting slot is provided with downward clamping teeth; wherein the downward clamping teeth are configured to engage with the upward clamping teeth, in order to limit the sliding of the clamping block in the mounting slot, and combine the clamping block to the mounting rail firmly; the downward clamping teeth are further configured to engage with the downward hook, to combine the limiting plate to the mounting rail firmly.

10. The fixing device of the photovoltaic panel according to claim 7, wherein the side plate is provided with a through hole;

the fixing device further comprises a screw, wherein the screw is configured to penetrate through the through hole to firmly fix the side pressure block and the photovoltaic panel together.

11. The fixing device of the photovoltaic panel according to claim 7, wherein a side portion of the mounting rail is provided with a trunking for placing a photovoltaic cable of the photovoltaic panel.

12. The fixing device of the photovoltaic panel according to claim 7, wherein a thickness of the downward hook and a thickness of the second clamping block are both less than a depth of the mounting slot.

* * * * *